(12) United States Patent
Theis et al.

(10) Patent No.: US 6,380,484 B1
(45) Date of Patent: *Apr. 30, 2002

(54) CABLE ROUTING DUCT

(75) Inventors: John W. Theis, Cottage Grove; Harry C. Sweere, Minneapolis, both of MN (US)

(73) Assignee: Ergotron, Inc., Eagan, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/073,656

(22) Filed: May 6, 1998

Related U.S. Application Data

(63) Continuation-in-part of application No. 08/745,428, filed on Nov. 12, 1996, now abandoned.

(51) Int. Cl.[7] .................................................. H02G 3/04
(52) U.S. Cl. ...................... 174/68.3; 174/72 A; 174/101
(58) Field of Search ........................... 174/68.3, 95, 97, 174/101, 72 R, 72 A, 217

(56) References Cited

U.S. PATENT DOCUMENTS

| | | | | |
|---|---|---|---|---|
| 2,896,009 A | * | 7/1959 | Caveney | 174/72 A |
| 3,321,571 A | * | 5/1967 | Lynch | 174/101 |
| 3,363,050 A | * | 1/1968 | Martin | 174/101 |
| 3,485,937 A | * | 12/1969 | Caveney | 174/101 |
| 3,890,459 A | * | 6/1975 | Caveney | 174/101 |
| 3,968,322 A | * | 7/1976 | Taylor | 174/72 A |
| 4,463,046 A | * | 7/1984 | Hutchinson et al. | 428/156 |
| 4,484,020 A | * | 11/1984 | Loof et al. | 174/68 C |
| 4,877,672 A | * | 10/1989 | Sheiner | 428/156 |
| 4,898,550 A | * | 2/1990 | Ayer | 439/718 |
| 4,942,271 A | * | 7/1990 | Corsi et al. | 174/101 |
| 5,235,136 A | * | 8/1993 | Santucci et al. | 174/68.3 |

* cited by examiner

Primary Examiner—Dean A. Reichard
Assistant Examiner—W. David Walkenhorst
(74) Attorney, Agent, or Firm—Schwegman, Lundberg, Woessner & Kluth, P.A.

(57) ABSTRACT

Cable routing duct for orderly carriage of and branching off or routing of wires, cables, fiber optics, tubular elements and the like, having a series of accessible chambers interrupted by wire accommodation slots. Access panels pivot about living hinges fashioned of co-injected plastic materials to allow access to the chambers.

20 Claims, 7 Drawing Sheets

CABLE ROUTING DUCT

CROSS REFERENCES TO CO-PENDING APPLICATIONS

This patent application is a continuation-in-part of Ser. No. 08/745,428 entitled "CABLE ROUTING DUCT" filed on Nov. 12, 1996, now abandoned.

BACKGROUND OF THE INVENTION

1. Field of the Invention

The present invention is for a cable routing duct, and more particularly, pertains to a cable routing duct having a series of accessible chambers and adjacent accommodation slots for cables or like-shaped elements.

2. Description of the Prior Art

Routing of cables is like unraveling fishing line or uncoiling a rattlesnake. Cable management has always been a time consuming, labor intensive task, usually requiring dexterity and patience, and extensive manual time-consuming labor.

The present invention overcomes the disadvantages of the prior art by providing a cable routing duct which can be easily installed with simple tools, such as a drill and screwdriver, and with simple hardware, such as screws or nuts and bolts, and which can easily be configured by a simple cutting device, such as a saw or shears.

SUMMARY OF THE INVENTION

The general purpose of the present invention is to provide a cable routing duct.

According to one embodiment of the present invention, there is provided a one-piece cable routing duct, including a series of rectangular-shaped chambers having common back, top and bottom planar members. Each chamber includes an access panel which includes, at one end, a living hinge of co-injected plastic materials, and at the other end, a latch member. The latch member engages a hook member to provide a secured chamber. A three-sided wire or cable accommodation slot separates adjacent chambers and provides for branching of cables, or like-shaped elements, such as wire, tubes, optical fibers, etc., from the interior of the chambers for routing to external components or devices. Any number of chambers can be opened in succession or on an individual basis, as desired, to easily insert or remove cables without disturbing other branched cables which are contained by unopened chambers. The access panels, when opened for cable insertion, spring to an open position about the co-injected living hinges to allow passage of cables to the interior of the chambers without interference from the access panel, which is conveniently held out of the way by the spring memory of the co-injected material living hinges.

An alternate embodiment discloses a cable routing duct having angular and memory relationships between planar members which promote positive locking of planar members.

One significant aspect and feature of the present invention is a cable routing duct having a series of accessible chambers separated by cable accommodation slots.

An additional significant aspect and feature of the present invention is access panels which secure by hook and latch engagement.

Another significant aspect and feature of the present invention is access panels having co-injected living hinges.

Still another significant aspect and feature of the present invention is a cable routing duct where the required number of chambers may be opened for access while at the same time leaving other chambers and cables undisturbed.

A further significant aspect and feature of the present invention is co-injected hinges exhibiting a spring-open memory to provide for positioning of access panels for non-interfering access to a chamber.

Another significant aspect and feature of the present invention is a cable routing duct which can be manufactured in various sizes, each with the same general profile and capabilities, to retain various sizes and numbers of cables.

Another significant aspect and feature of the present invention is a cable routing duct with a flat rear surface to provide a mounting means for attaching to frames or other media via holes punched in the rear mounting surface or by two-sided adhesive tape.

Another significant aspect and feature of the present invention is the incorporation of an angle between the planar back member and the planar bottom member for providing a positive locking method between planar members of the accessible chambers.

Having thus described significant aspects and features of the present invention, it is the principal object of the present invention to provide a cable routing duct.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
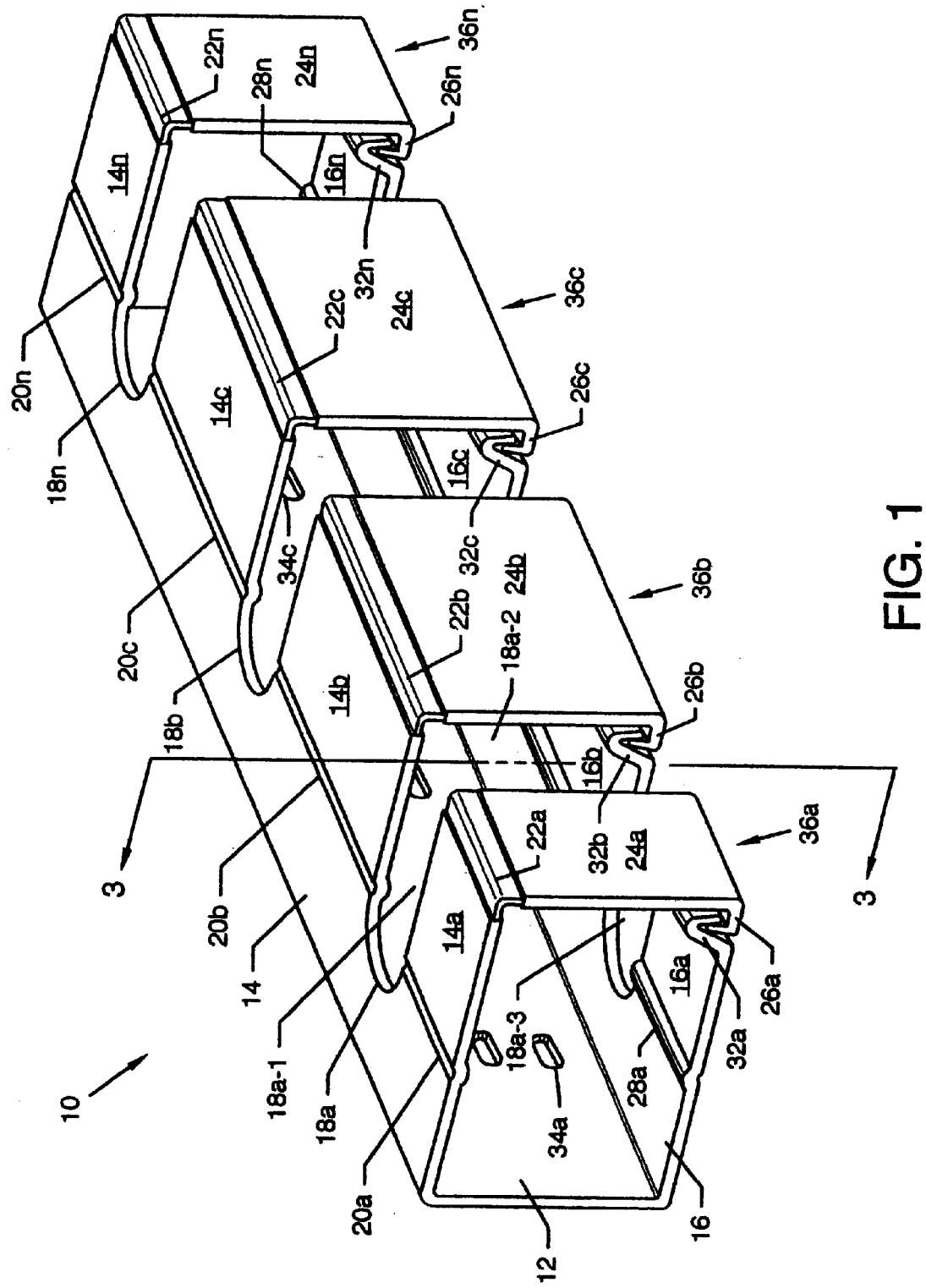
FIG. 1 illustrates an isometric view of a cable routing duct constructed according to the present invention.

FIG. 1 illustrates an isometric view of a cable routing duct 10 constructed according to the present invention. The cable routing duct 10 is constructed of suitable length, in channel form, of a flexible and suitable plastic material, and includes individual living hinge members which allow access to the interior chambers of the cable routing duct 10 for the purpose of cable routing, distribution branching, and the like. The cable routing duct 10 includes a planar back member 12, a planar top member 14, and a planar bottom member 16. The planar top member 14 includes one end of a plurality of cable or wire accommodation slots 18a–18n aligned at right angles to the longitudinal axis of the cable routing duct 10 and extending about the longitudinal axis. Wire slot 18a can be further defined to designate an upper horizontal wire slot portion 18a–1, a vertical wire slot portion 18a–2, and a lower horizontal wire slot portion 18a–3. Remaining wire slots 18b–18n can also be defined in a like fashion and are illustrated where required. The upper portions of wire accommodation slots 18a–18n and deformed stiffeners 20a–20n delineate upper rectangular planar areas 14a–14n which are part of the planar top 14. Living hinges 22a–22n, which are of co-injected materials, extend from the upper rectangular planar areas 14a–14n to connect in continuous fashion to access panels 24a–24n, respectively. Each living hinge is a co-injected dual durometer living hinge. Individual planar rectangular access panels, illustrated in vertical alignment, connect in continuous fashion to living hinges 22a–22n, respectively, and include latch members 26a–26n extending inwardly. The planar bottom member 16 includes the other end of a plurality of cable or wire accommodation slots 18a–18n aligned at right angles to the longitudinal axis of the cable routing duct 10 and extending about the longitudinal axis. The lower portions of wire accommodation slots 18a–18n and deformed stiffeners 28a–28n delineate lower rectangular planar areas 16a–16n which are part of the planar bottom member 16. Hook members 32a–32n are located at the outboard ends of the lower planar areas 16a–16n to mate with the corresponding latch members 26a–26n on an individual basis. A plurality of mounting holes 34a–34n are located in the planar back member 12. A plurality of chambers 36a–36n are formed by corresponding and respective portions of the back member 12, the uninterrupted portion of the top member 14, the deformed stiffeners 20a–20n, the upper planar areas 14a–14n, the living hinges 22a–22n, the access panels 24a–24n, the latch members 26a–26n, the uninterrupted portion of the bottom member 16, the deformed stiffeners 28a–28n, the lower planar areas 16a–16n, and the hook members 32a–32n.

Figure 2:
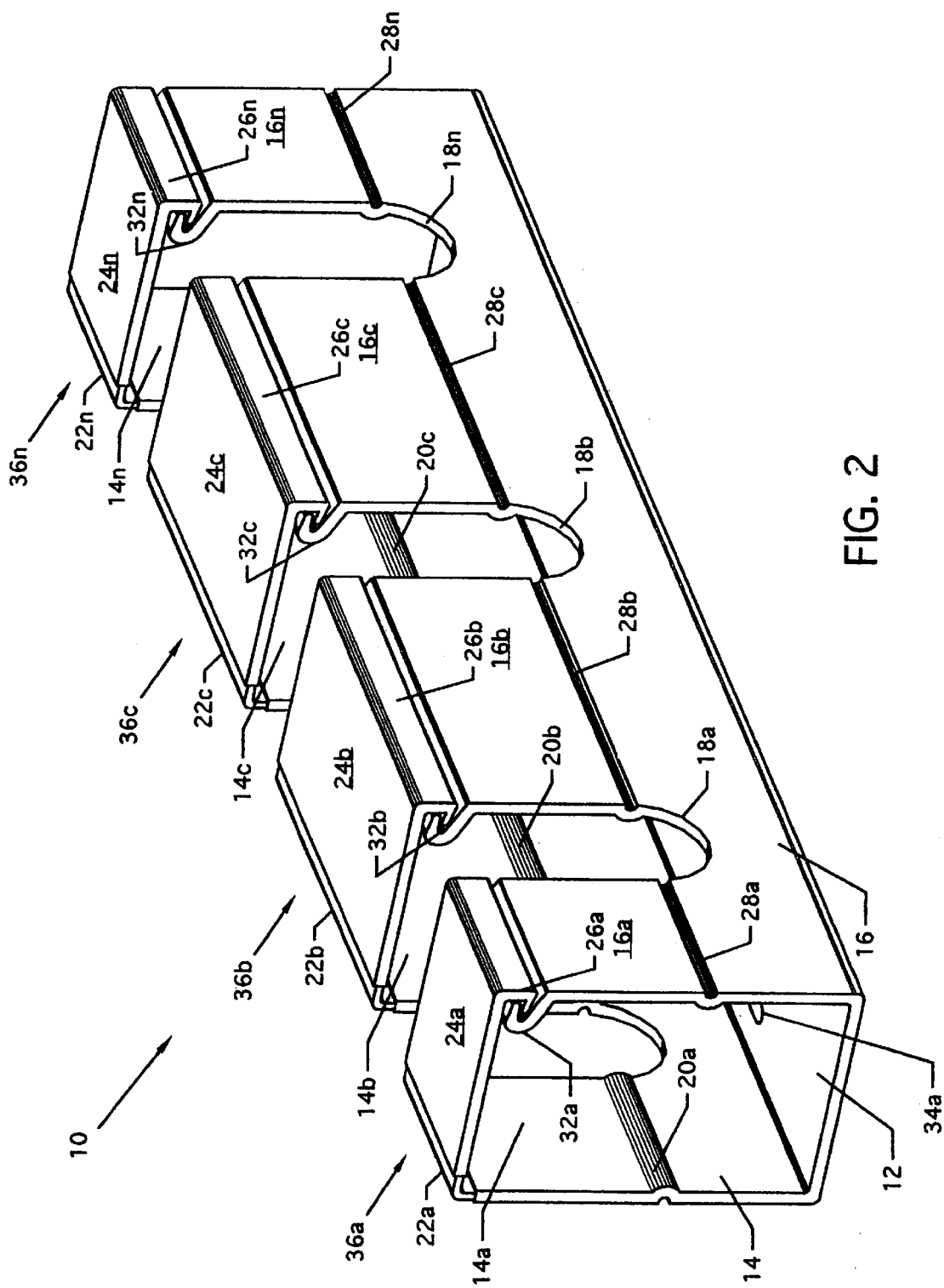
FIG. 2 illustrates a rotated isometric view of the cable routing duct.

FIG. 2 illustrates a rotated isometric view of the cable routing duct 10, where all numerals correspond to those elements previously or otherwise described.

Figure 3:
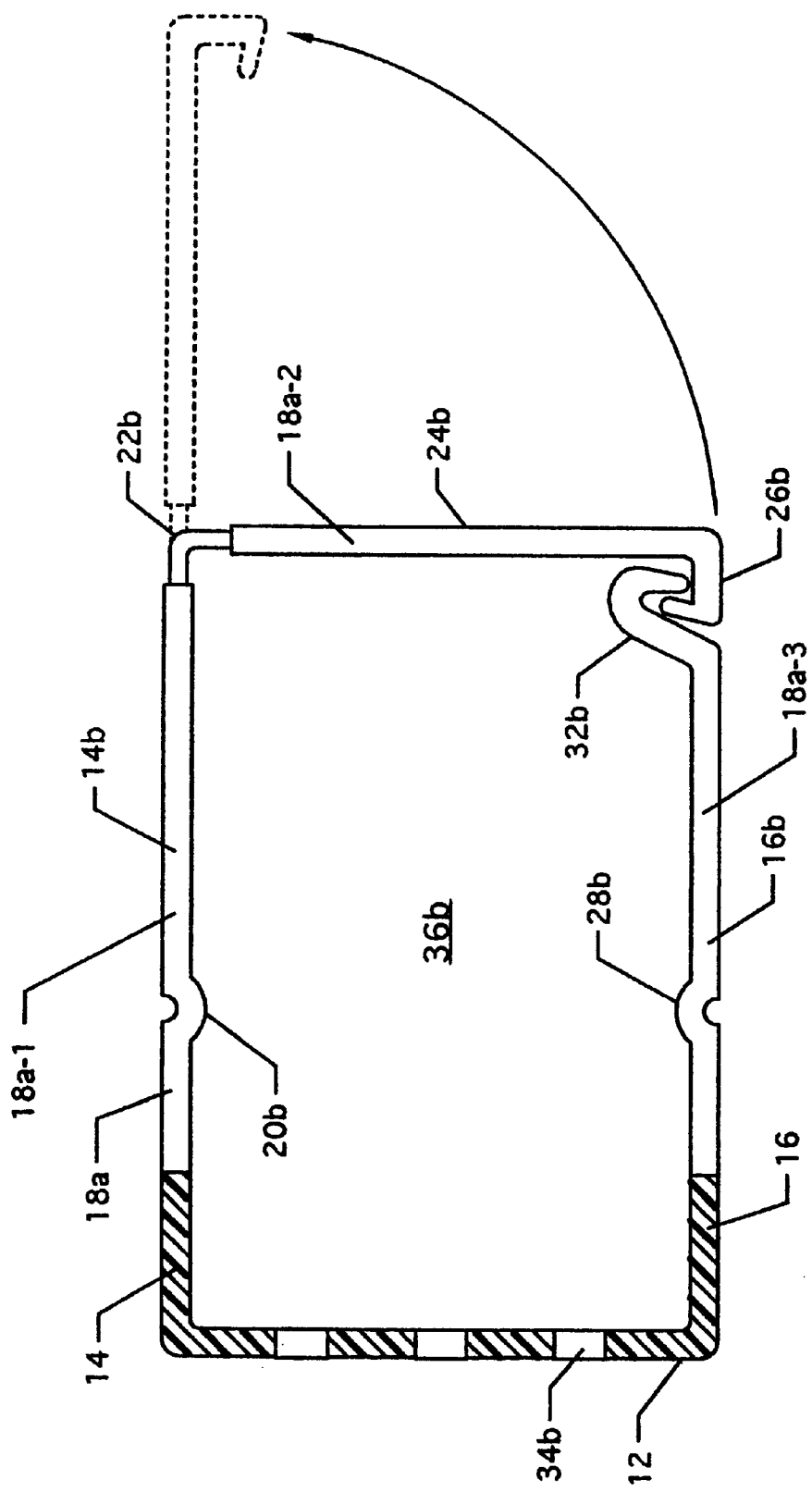
FIG. 3 illustrates a cross sectional end view of the cable routing duct along line 3—3 of FIG. 1.

FIG. 3 illustrates a cross sectional end view of the cable routing duct 10 along line 3—3 of FIG. 1, where all numerals correspond to those elements previously or otherwise described. Access panel 24b can be opened to a position as indicated by dashed lines; and cables, wires, tubes, optical fibers, or other types of lines can be inserted into the interior of the cable routing duct 10 and distributed as illustrated later in detail.

MODE OF OPERATION

Figure 4:
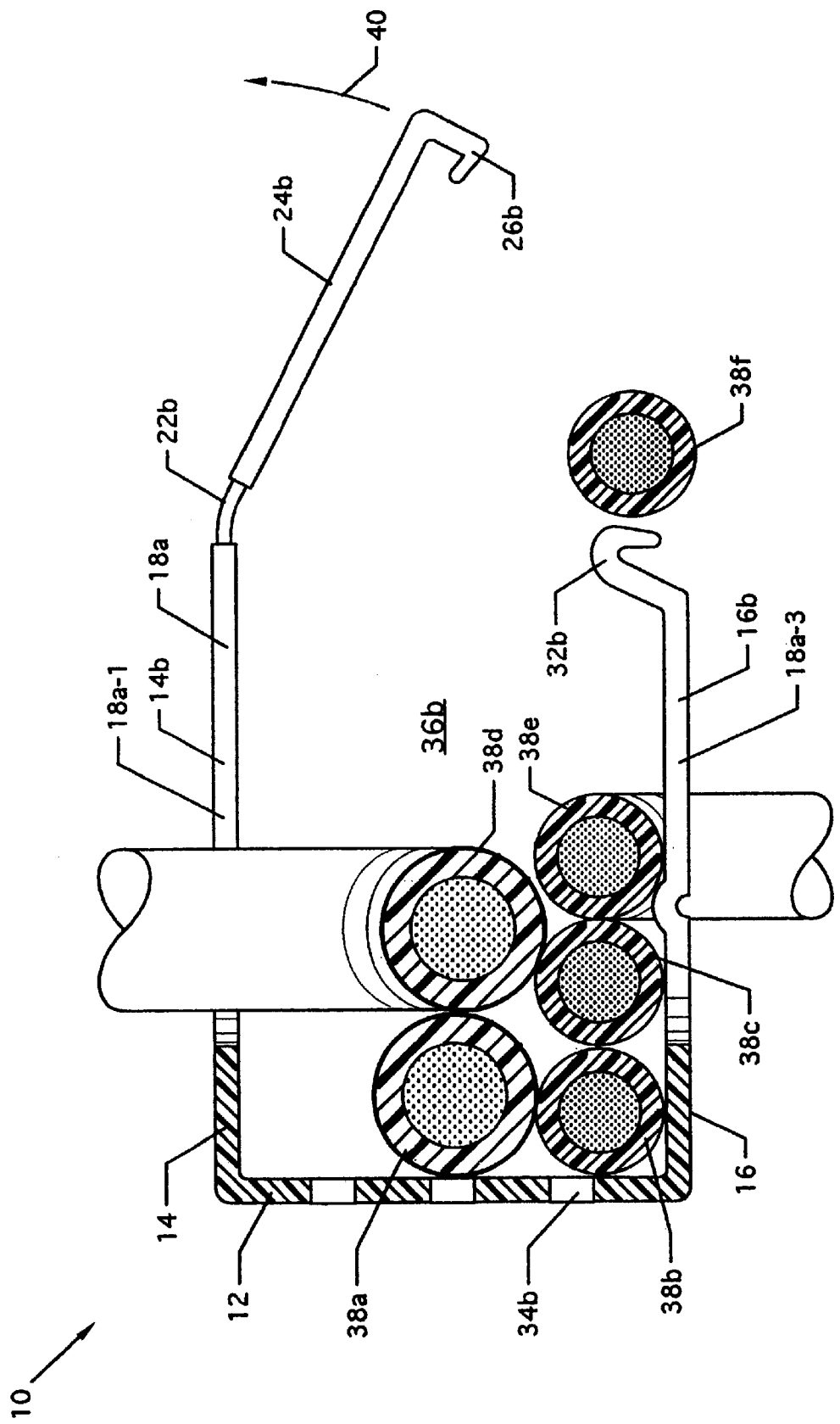
FIG. 4 illustrates the cable routing duct of FIG. 3 having a plurality of cables residing therein and a cable ready for entering therein.

FIG. 4 illustrates the cable duct of FIG. 3 having a plurality of cables 38a–38e residing in the chamber 36a (see FIG. 5) of the cable routing duct 10 and extending into chamber 36b, where all numerals correspond to those elements previously or otherwise described. Cable 38d is illustrated as exiting the interior area of the cable routing duct 10 from the upper horizontally aligned wire portion 18a–1 of the wire accommodation slot 18a. Cable 38e exits the interior area of the cable routing duct 10 from the lower horizontally aligned wire portion 18b–3 of the wire accommodation slot 18b. Access panel 24b is rotated about the living hinge 22b, as illustrated by arrow 40, to allow access to the chamber 36b for placement of cable 38f into the chamber 36b subsequent to manual disengagement of latch member 26b from hook member 32b. The co-injected materials of the living hinges 22a–22n exhibit memory to keep the access panels 24a–24n positioned away from the openings to the chambers 36a–36n so as to allow unimpeded and unobstructed entrance to the chambers 36a–36n without the need of manually positioning and holding the access panels out of the way. Manual disengagement is accomplished by manually depressing and flexing the lower planar area 16b upwardly. Access panels 24c–24n, of FIG. 5, would also be opened in a like fashion to allow further access and entry of the cable 38f, or other such cables or tubular devices, into the chambers 36c–36n. The extrusion can be of a mixture of polyvinylchloride, such as by Geon, and an extrusion grade urethane.

Figure 5:
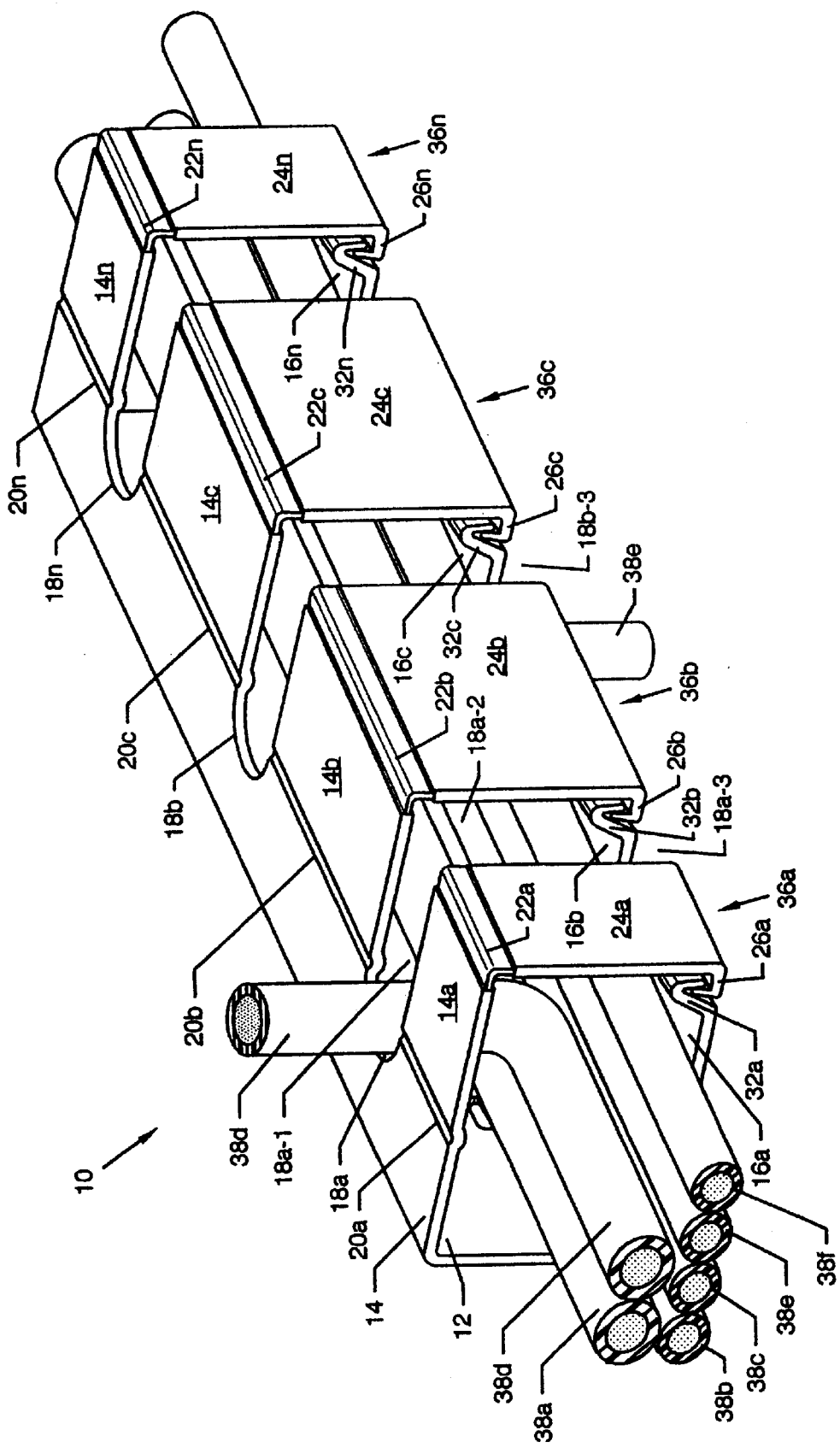
FIG. 5 illustrates an isometric view of the cable routing duct containing a plurality of cables.

FIG. 5 illustrates an isometric view of the cable routing duct 10 containing a plurality of cables 38a–38f, where all numerals correspond to those previously or otherwise described. Illustrated in particular is the exiting of the cables 38d and 38e from the wire accommodation slots 18a and 18b, respectively.

Figure 6:
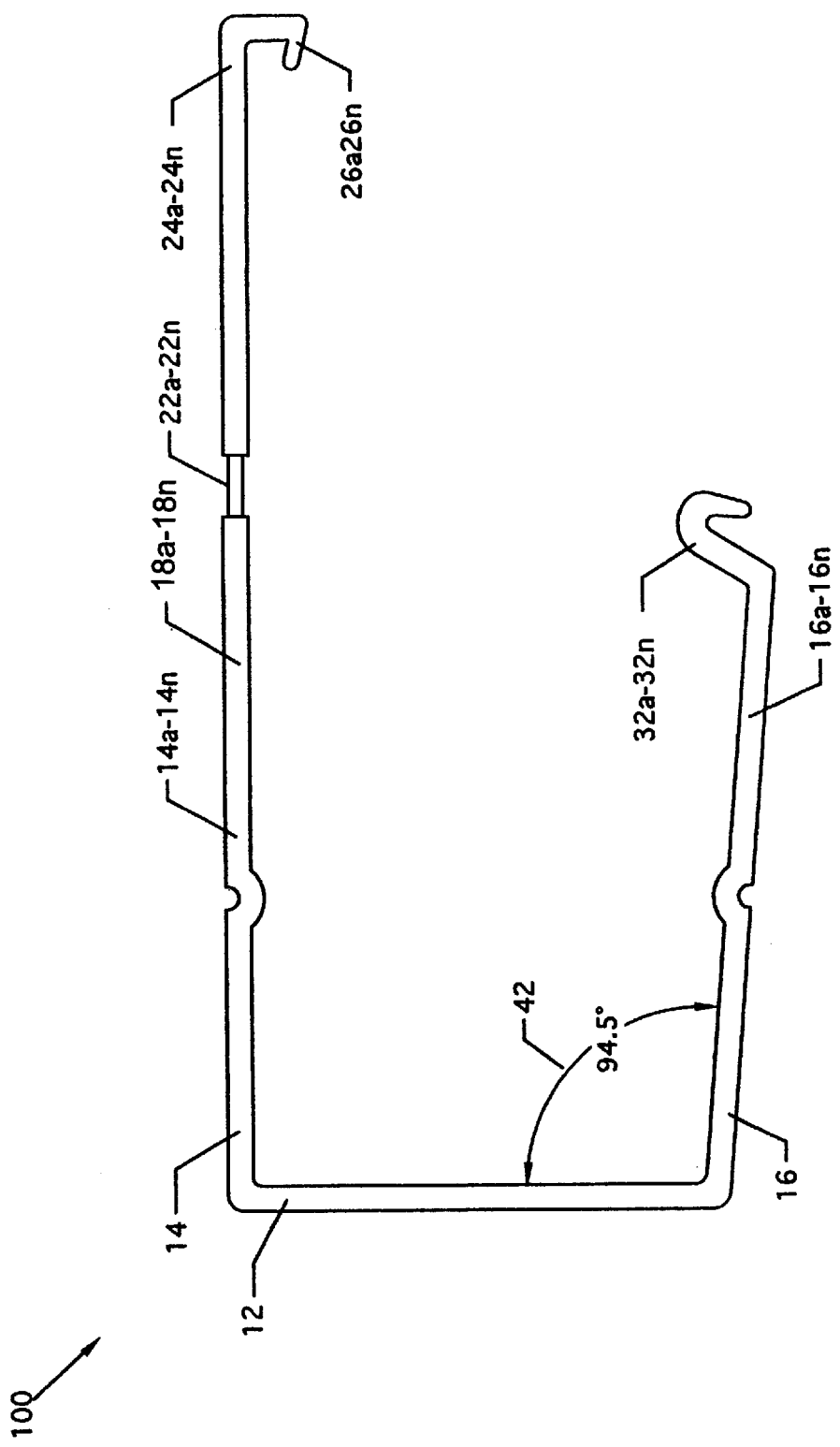
FIG. 6, an alternative embodiment, illustrates an end view of a cable routing duct incorporating angular relationship between the planar bottom member and the planar back member; and, FIG. 7 illustrates the cable routing duct of FIG. 6 where the latch members are in positive engagement with the hook members to form a closed cable routing duct.
Figure 7:
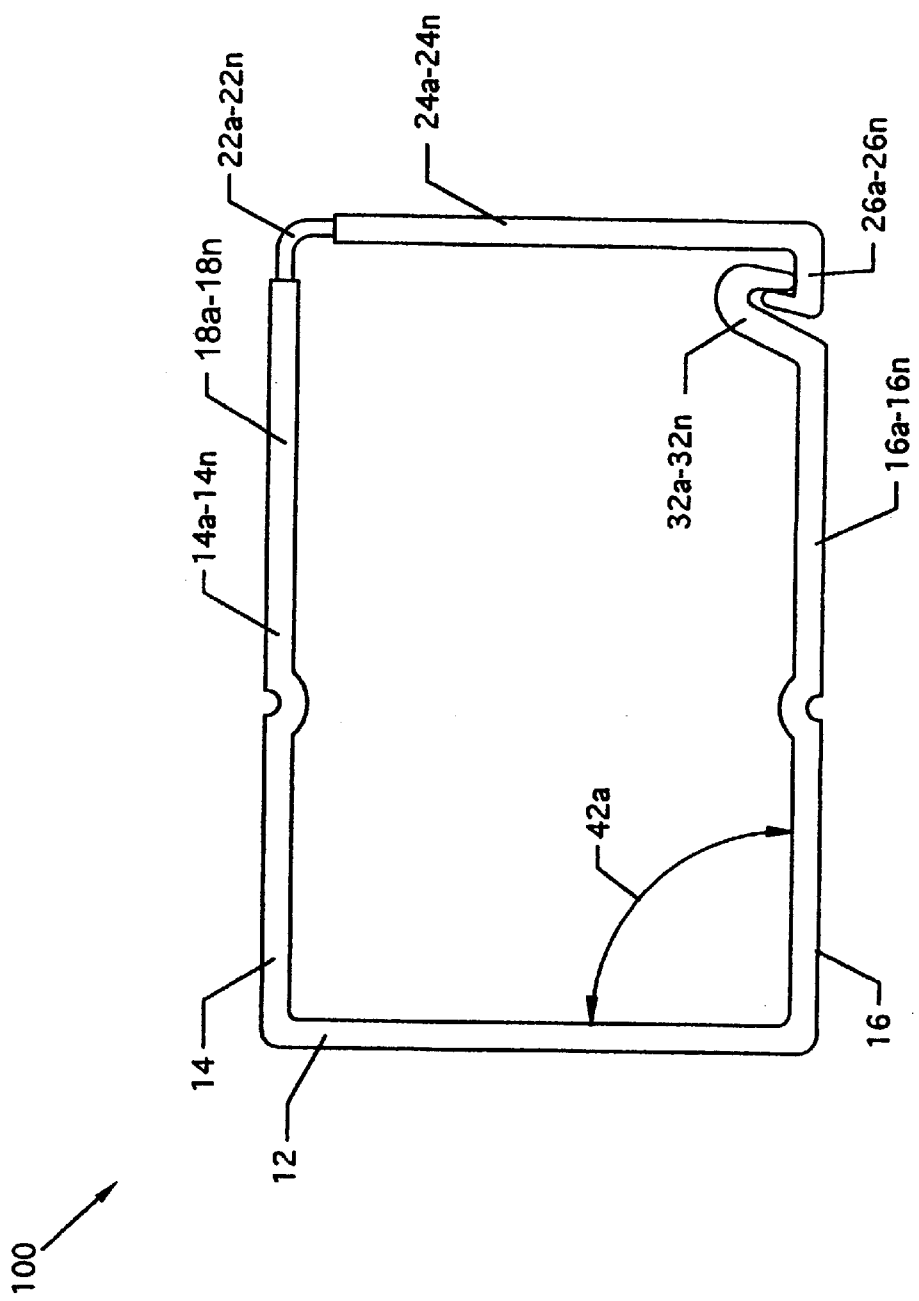

FIG. 6, an alternative embodiment, illustrates an end view of a cable routing duct 100 where each component is the same as previously or otherwise described for the cable routing duct 10, but incorporating a different angular relationship between the planar bottom member 16, including lower planar areas 16a–16n, and the planar back member 12. Access panels 24a–24n are molded in line with the planar top member 14, including upper planar areas 14a–14n, and with living hinges 22a–22n. The planar bottom member 16, including lower planar areas 16a–16n, are molded at an angle 42 of 94.5°, for purposes of illustration, to the planar back member 12. In use, access panels 24a–24n are rotated about the living hinges 22a–22n to engage, on an individual basis, the hook members 32a–32n at the ends of the lower planar areas 16a–16n. as illustrated in FIG. 7. The memory exhibited across the junction of the planar back member 12 and planar bottom member 16 which form angle 42 urges the bottom member 16, including lower planar areas 16a–16n, and the hook members 32a–32n in a direction which attempts to maintain a 94.5° angle between the planar back member 12 and the planar bottom member 16 and lower planar areas 16a–16n even though substantially a 90° angle is maintained due to the self-limiting engagement of the latch members 26a–26n with the hook members 32a–32n. Inclusion of angle 42 between the planar back member 12 and the planar bottom member 16 urges positive locking of the lower planar areas 16a–16n to the access panels 24a–24n.

FIG. 7 illustrates an end view of the cable routing duct 100 of FIG. 6, where the latch members 26a–26n are in forced positive engagement with the hook members 32a–32n, where all numerals correspond to those elements previously or otherwise described. Angle 42 is resultantly and collectively reduced and urged toward a right angle 42a, substantially, with the engagement of the latch members 26a–26n with hook members 32a–32n to form a closed cable routing duct.

Various modifications can be made to the present invention without departing from the apparent scope hereof.

| CABLE ROUTING DUCT PARTS LIST | |
|---|---|
| 10 | cable routing duct |
| 12 | planar back member |
| 14 | planar top member |

-continued

CABLE ROUTING DUCT PARTS LIST

| | |
|---|---|
| 14a-n | upper planar areas |
| 16 | planar bottom member |
| 16a-n | lower planar areas |
| 18a-n | slots, wire accommodation |
| 18a-1 | upper horizontal portion |
| 18a-2 | vertical portion |
| 18a-3 | lower horizontal portion |
| 20a-n | deformed stiffeners |
| 22a-n | living hinges |
| 24a-n | access panels |
| 26a-n | latch members |
| 28a-n | deformed stiffeners |
| 32a-n | hook members |
| 34a-n | mounting holes |
| 36a-n | chambers |
| 38a-f | cables |
| 40 | arrow |
| 42 | angle |
| 42a | right angle |

What is claimed is:

1. A routing duct comprising:
  an elongate back member having a front side, a rear side, a top edge, a bottom edge, and first and second ends;
  a top member connected to said top edge of said back member, said top member having an inside surface, said top member extending forwardly of said front side of said back member, and terminating in a free edge, said top member having first and second ends and a length between said first and second ends which is substantially coextensive with a length of said back member;
  a bottom member connected to said bottom edge of said back member, said bottom member having an inside surface, said bottom member extending forwardly of said front side of said back member, at an angle between the inside surface of the top member and the inside surface of the bottom member while in an unlatched state, the angle being greater than zero degrees and terminating in a hook member, said bottom member having first and second ends and a length between said first and second ends which is substantially coextensive with the length of said back member;
  a plurality of longitudinally spaced-apart slot pairs formed in said top and bottom members, each slot pair comprising a slot in said top member extending through said free edge and rearwardly toward said back member but terminating forward of said front side of said back member, and a slot in said bottom member located directly opposite to and aligned with said slot in said top member and extending through said hook member and rearwardly toward said back member but terminating forward to said front side of said back member;
  a plurality of access panels, each access panel having first and second edges and first and second ends, the first edge of each access panel being connected to said free edge of said top member by a living hinge, and the second edge of each access panel having a latch member for latching engagement with said hook member of said bottom member, each access panel being individually unlatchable from said hook member and pivotable about said living hinge to obtain access to the interior of the cable duct.

2. The duct as defined in claim 1, wherein said back member, said top member, said bottom member, said hook member, said access panels, said living hinges, and said latch members are all formed unitarily in one piece.

3. The duct as defined in claim 1, wherein said back member, said top member, said bottom member including said hook member thereof, and said access panels including said latch members thereof are all formed of a first material having a first durometer, and wherein said living hinges are formed of a second material having a second durometer which is lower than said first durometer.

4. The duct as defined in claim 3, wherein said back member, said top member, said bottom member including said hook member thereof, said access panels including said latch members thereof, and said living hinges are a one-piece extrusion produced by dual-durometer co-extrusion.

5. The duct as defined in claim 1, wherein each of said living hinges has a spring-open memory such that when the latch member of an access panel is unlatched from said hook member of said bottom member, the access panel springs to an open position to allow unimpeded access to the interior of the associated chamber.

6. The duct as defined in claim 1, wherein said top and bottom members include stiffeners in the areas thereof located between adjacent slots.

7. The duct as defined in claim 1, wherein said slots in said top and bottom member have equal lengths.

8. The duct as defined in claim 1, wherein said slots in said top and bottom members have equal widths.

9. The duct as defined in claim 8, wherein each access panel is spaced from each adjacent access panel by a distance equal to the width of said slots.

10. The duct as defined in claim 9, wherein the spaces between adjacent access panels are aligned with said slot pairs.

11. The duct as defined in claim 1, wherein the number of access panels exceeds the number of slot pairs by one.

12. The duct as defined in claim 1, wherein each access panel is spaced from each adjacent access panel, and wherein the spaces between adjacent access panels are in alignment with said slot pairs.

13. The duct as defined in claim 1, wherein said slots in the top and bottom members forming said slot pairs are the only slots provided in said top and bottom members.

14. A routing duct comprising:
  an elongate U-shaped channel composed of a back member having a front side and a first upstanding side member extending from the back member, and a second upstanding side member having an inner side, and extending from the back member at an angle greater than about 90 degrees while in an unlatched state, the angle being between the front side of the back member and the inner side of the second upstanding side member,
  a plurality of spaced-apart, individually openable access panels spanning said first and second upstanding side members, each access panel having two edges and two ends, each access panel further having a living hinge on one of its two edges and a latch member on the other of its two edges;
  each of said living hinges being connected to the first upstanding side member of said U-shaped channel, and each of said latch members mating with a hook member located on the second upstanding side member of said U-shaped channel;
  slots in said first and second upstanding side members of said U-shaped channel between adjacent ends of said access panels; and,
  the spacing between adjacent ends of said spaced-apart access panels being equal to the width of said slots in said first and second upstanding side members of said U-shaped channel.

15. A routing duct comprising:

an elongated back member having a front side, a rear side, a top edge, a bottom edge, and first and second ends;

a top member connected to said top edge of said back member, extending forwardly of said front side of said back member, and terminating in a free edge, said top member having first and second ends and a length between said first and second ends which is substantially coextensive with a length of said back member;

a bottom member connected to said bottom edge of said back member, said bottom member having an inner side, said bottom member extending forwardly of said front side of said back member, and downwardly at an angle that is obtuse while in an unlatched state, the angle being between the front side of the back member and the inner side of the bottom member, and terminating in a hook member, said bottom member having first and second ends and a length between said first and second ends which is substantially coextensive with the length of said back member;

a plurality of longitudinally spaced-apart slot pairs formed in said top and bottom members, each slot pair comprising a slot in said top member extending through said free edge and rearwardly toward said back member but terminating forward of said front side of said back member, and a slot in said bottom member located directly opposite to and aligned with said slot in said top member and extending through said hook member and rearwardly toward said back member but terminating forward to said front side of said back member;

a series of longitudinally spaced discrete chambers defined by portions of said back, top and bottom members extending between said back, top and bottom member first ends and a slot pair, by portions of said back, top and bottom members extending between spaced-apart slot pairs, and by portions of said back, top and bottom members extending between a slot pair and said back, top and bottom member second ends;

a plurality of access panels, one for each longitudinally spaced discrete chamber, each access panel having first and second edges and first and second ends, the first edge of each access panel being connected to said free edge of said top member by a living hinge, and the second edge of each access panel having a latch member for latching engagement with said hook member of said bottom member;

each access panel can be individually unlatched from said hook member and pivoted about its living hinge to obtain access to the interior of the associated chamber;

said back member, said top member, said bottom member, said hook member, said access panels, said living hinges, and said latch members are all formed unitarily in one piece;

said back member, said top member, said bottom member including said hook member thereof, and said access panels including said latch members thereof are all formed of a first material having a first durometer, and wherein said living hinges are formed of a second material having a second durometer which is lower than said first durometer;

said back member, said top member, said bottom member including said hook member thereof, said access panels including said latch members thereof, and said living hinges are a one-piece extrusion produced by dual-durometer co-extrusion;

each of said living hinges has a spring-open memory such that when the latch member of an access panel is unlatched from said hook member of said bottom member, the access panel springs to an open position to allow unimpeded access to the interior of the associated chamber;

said top and bottom members include stiffeners in the areas thereof located between adjacent slots;

said slots in said top and bottom member have equal lengths;

said slots in said top and bottom members have equal widths;

each access panel is spaced from each adjacent access panel by a distance equal to the width of said slots;

the spaces between adjacent access panels are aligned with said slot pairs;

the number of access panels exceeds the number of slot pairs by one;

each access panel is spaced from each adjacent access panel, and wherein the spaces between adjacent access panels are in alignment with said slot pairs; and, said slots in the top and bottom members forming said slot pairs are the only slots provided in said top and bottom members.

16. A routing duct comprising:

an elongated back member having a front side, a rear side, a top edge, a bottom edge, and first and second ends;

a top member having an inside surface connected to said top edge of said back member, extending forwardly of said front side of said back member, and terminating in a free edge, said top member having first and second ends and a length between said first and second ends which is substantially coextensive with a length of said back member;

a bottom member connected to said bottom edge of said back member, said bottom member having an inside surface, said bottom member extending forwardly of said front side of said back member, at an angle between the inside surface of the top member and the inside surface of the bottom member while in an unlatched state, the angle being acute, and terminating in a hook member, said bottom member having first and second ends and a length between said first and second ends which is substantially coextensive with the length of said back member;

a plurality of longitudinally spaced-apart slot pairs formed in said top and bottom members, each slot pair comprising a slot in said top member extending through said free edge and rearwardly toward said back member but terminating forward of said front side of said back member, and a slot in said bottom member located directly opposite to and aligned with said slot in said top member and extending through said hook member and rearwardly toward said back member but terminating forward to said front side of said back member;

a series of longitudinally spaced discrete chambers defined by portions of said back, top and bottom members extending between said back, top and bottom member first ends and a slot pair, by portions of said back, top and bottom members extending between spaced-apart slot pairs, and by portions of said back, top and bottom members extending between a slot pair and said back, top and bottom member second ends; and a plurality of access panels, one for each longitudinally spaced discrete chamber, each access panel having first and second edges and first and second ends, the first edge of each access panel being connected to said free edge of said top member by a living hinge, and the second edge of each access panel having a latch member, each access panel being individually unlatchable from said hook member and pivotable about said living hinge to obtain access to the interior of the associated chamber.

17. The duct as defined in claim 16, wherein said back member, said top member, said bottom member, said hook member, said access panels, said living hinges, and said latch members are all formed unitarily in one piece.

18. The duct as defined in claim 16, wherein each of said living hinges has a spring-open memory such that when the latch member of an access panel is unlatched from said hook member of said bottom member, the access panel springs to an open position to allow unimpeded access to the interior of the associated chamber.

19. The duct as defined in claim 16, wherein each access panel is spaced from each adjacent access panel, and wherein the spaces between adjacent access panels are in alignment with said slot pairs.

20. The duct as defined in claim 16, wherein said plurality of access panels are individually openable to reposition a cable with out repositioning other cables secured by access panels in a latched position.

* * * * *